(12) United States Patent
Burns et al.

(10) Patent No.: US 12,321,507 B2
(45) Date of Patent: Jun. 3, 2025

(54) RANKING A USER'S PREFERENCE MODEL IN A VIRTUAL REALITY ENVIRONMENT

(71) Applicant: INTERNATIONAL BUSINESS MACHINES CORPORATION, Armonk, NY (US)

(72) Inventors: Jill Burns, Wake Forest, NC (US); Nicholas Tsang, Saratoga, CA (US); Haoyang Li, Durham, NC (US); Adriana Valido, Miami Dade, FL (US); Dama Che Reffett, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/804,604

(22) Filed: May 31, 2022

(65) Prior Publication Data

US 2023/0384857 A1    Nov. 30, 2023

(51) Int. Cl.
*G06F 3/01* (2006.01)
*G06F 3/04815* (2022.01)
*G06F 18/23* (2023.01)
*G06T 19/00* (2011.01)

(52) U.S. Cl.
CPC .......... *G06F 3/011* (2013.01); *G06F 3/04815* (2013.01); *G06F 18/23* (2023.01); *G06T 19/006* (2013.01)

(58) Field of Classification Search
CPC ...... G06F 3/011; G06F 18/23; G06F 3/04815; G06F 3/016; G06F 3/167; G06F 2203/012; G06F 2203/011; G06T 19/006; G06Q 30/0643; G06Q 30/0623; G06Q 30/0631; G09B 5/02; G09B 9/00; H04L 67/125; H04L 67/306
See application file for complete search history.

(56) References Cited

U.S. PATENT DOCUMENTS 10,691,726 B2 *  6/2020  Rapaport ............... G06Q 30/02
10,943,271 B2 *  3/2021  Miller ................ G06Q 30/0276
2002/0113809 A1  8/2002  Akazawa
(Continued)

OTHER PUBLICATIONS

Disclosed Anonymously, "Decor recommendation in a personalized environment," ip.com, IP.com No. IPCOM000253066D, IP.com Publication Date: Mar. 2, 2018, 4 pages.
(Continued)

*Primary Examiner* — Abderrahim Merouan
(74) *Attorney, Agent, or Firm* — Michael O'Keefe (57) ABSTRACT

According to one embodiment, a method, computer system, and computer program product for augmented reality/virtual reality (AR/VR) preference mapping is provided. The embodiment may include capturing a plurality of user preferences from a plurality of user feedback while a user interacts with elements of an AR/VR space. The embodiment may also include mapping one or more user preferences from the plurality of captured user preferences to one or more clusters. The embodiment may further include generating a user preference model of the elements based on the one or more mapped user preferences. The embodiment may also include displaying the user preference model in the AR/VR space.

17 Claims, 6 Drawing Sheets

(56) References Cited

U.S. PATENT DOCUMENTS

| | | | |
|---|---|---|---|
| 2010/0121810 A1* | 5/2010 | Bromenshenkel | G06F 3/04815 |
| | | | 706/54 |
| 2010/0198653 A1* | 8/2010 | Bromenshenkel | G06Q 30/06 |
| | | | 715/757 |
| 2011/0010636 A1 | 1/2011 | Hamilton, II | |
| 2013/0104058 A1* | 4/2013 | Bromenshenkel | G06F 3/04815 |
| | | | 715/757 |
| 2016/0077547 A1 | 3/2016 | Aimone | |
| 2016/0150260 A1* | 5/2016 | Ovide | H04N 21/2668 |
| | | | 725/12 |
| 2017/0115992 A1* | 4/2017 | Krishnamurthy | G06F 1/3287 |
| 2017/0300472 A1* | 10/2017 | Parikh | G06F 40/205 |
| 2018/0005312 A1* | 1/2018 | Mattingly | G06F 3/04815 |
| 2018/0232921 A1 | 8/2018 | Smith | |
| 2019/0251612 A1* | 8/2019 | Fang | G06Q 30/0643 |
| 2020/0057487 A1 | 2/2020 | Sicconi | |
| 2020/0098031 A1* | 3/2020 | Sato | G06F 16/9535 |
| 2020/0394361 A1* | 12/2020 | Parikh | G06F 40/274 |
| 2021/0081650 A1 | 3/2021 | Kienzle | |
| 2021/0082300 A1* | 3/2021 | Silverstein | G06F 3/011 |
| 2021/0158800 A1* | 5/2021 | Kim | G06F 3/0484 |
| 2021/0335050 A1 | 10/2021 | Zavesky | |
| 2021/0357447 A1* | 11/2021 | McKenzie | G11B 27/34 |
| 2021/0357994 A1* | 11/2021 | Lavasanijou | G06F 3/0482 |
| 2021/0390606 A1* | 12/2021 | Moosaei | G06Q 30/0269 |
| 2021/0400142 A1 | 12/2021 | Jorasch | |
| 2022/0129064 A1* | 4/2022 | Gueye | G01C 21/3492 |
| 2022/0138670 A1* | 5/2022 | Goodman | G06Q 30/0202 |
| | | | 705/7.31 |
| 2022/0319666 A1* | 10/2022 | Kim | G06Q 50/22 |
| 2022/0414754 A1* | 12/2022 | Afshar | G06Q 30/0643 |
| 2023/0093331 A1 | 3/2023 | Jepperson et al. | |
| 2023/0267525 A1* | 8/2023 | Singh | G06Q 30/0631 |
| | | | 705/26.7 |

OTHER PUBLICATIONS

Disclosed Anonymously, "Environment Style Selector, Identifier, and Visualizer for Online Recommendations," ip.com, IP.com No. IPCOM000243605D, IP.com Publication Date: Oct. 5, 2015, 3 pages.

Disclosed Anonymously, "Method and system for designs/decoration recommendations based on smart spaces assessment," ip.com, IP.com No. IPCOM000251729D, IP.com Publication Date: Nov. 29, 2017, 5 pages.

Mell, et al., "The NIST Definition of Cloud Computing", National Institute of Standards and Technology, Special Publication 800-145, Sep. 2011, 7 pages.

* cited by examiner

RANKING A USER'S PREFERENCE MODEL IN A VIRTUAL REALITY ENVIRONMENT

BACKGROUND

The present invention relates generally to the field of computing, and more particularly to augmented reality and virtual reality (AR/VR).

Virtual reality relates to technology that generates an immersive, computer-rendered environment in which a user can engage with and experience through various sensory feedbacks. Similarly, augmented reality relates to technology that modifies a direct or indirect user view of a real-world environment with computer-generated elements using various inputs, such as sound data, image data, or location data. Various technologies may be implemented when utilizing AR/VR, such as eyeglasses, head-mounted displays, head-up displays, contact lenses, virtual reality displays, and handheld displays. Augmented reality may have numerous applications within society including uses in literature, architecture, visual art, education, emergency management, video gaming, medicine, military, navigation, tourism, language translation, and music production.

SUMMARY

According to one embodiment, a method, computer system, and computer program product for augmented reality/virtual reality (AR/VR) preference mapping is provided. The embodiment may include capturing a plurality of user preferences from a plurality of user feedback while a user interacts with elements of an AR/VR space. The embodiment may also include mapping one or more user preferences from the plurality of captured user preferences to one or more clusters. The embodiment may further include generating a user preference model of the elements based on the one or more mapped user preferences. The embodiment may also include displaying the user preference model in the AR/VR space.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to augmented reality and virtual reality (AR/VR). The following described exemplary embodiments provide a system, method, and program product to, among other things, identify user preferences based on user interactions in an AR/VR environment and generate an AR/VR model that displays one or more objects conforming to the identified user preferences. Therefore, the present embodiment has the capacity to improve the technical field of AR/VR by presenting more accurate and individualized depictions of user preferred objects within an environment than typical user behavior modeling that relies on classifying and clustering users into groups based on captured user actions and then predicts future user behavior or interests from the captured historical interactions.

As previously described, virtual reality relates to technology that generates an immersive, computer-rendered environment in which a user can engage with and experience through various sensory feedbacks. Similarly, augmented reality relates to technology that modifies a direct or indirect user view of a real-world environment with computer-generated elements using various inputs, such as sound data, image data, or location data. Various technologies may be implemented when utilizing AR/VR, such as eyeglasses, head-mounted displays, head-up displays, contact lenses, virtual reality displays, and handheld displays. Augmented reality may have numerous applications within society including uses in literature, architecture, visual art, education, emergency management, video gaming, medicine, military, navigation, tourism, language translation, and music production.

With the growth of the Internet and mobile devices, many systems have been developed to capture user interactions through programs and applications on user devices. Using the captured user interactions data, specific data points may be extracted and analyzed to determine user preferences that aide in the ability to personalize content throughout the user experience. However, many personalization mechanisms experience limitations in for the form of reliance on past user behavior and interactions, the ability to collect the data through various systems, and are specific to online actions. As such, it may be advantageous to, among other things, utilize AR/VR technology to capture real-time user feedback, such as spontaneous user statements when interacting with an object, to identify user preferences and generate a model in an AR/VR environment that corresponds to the identified user preferences.

According to at least one embodiment, individual user preferences may be gathered and ranked based on user interactions with an AR/VR system. By measuring the user's interactions, spoken language, movements, and biometrics, information may be extracted that identifies elements in which a user is truly interested. From the identified elements, a model that represents the user's true interests may be generated. The generated model may be a multidimensional/multimodal model that considers each identified user preference and understands key characteristics of the user to generate a set of preferences ranked in importance to the user based on the user's direct interactions with the system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate a multidimensional/multimodal model of ranked user preferences for generation of an AR/VR environment that depicts elements satisfying user preference thresholds according to the ranked user preferences.

Figure 1:
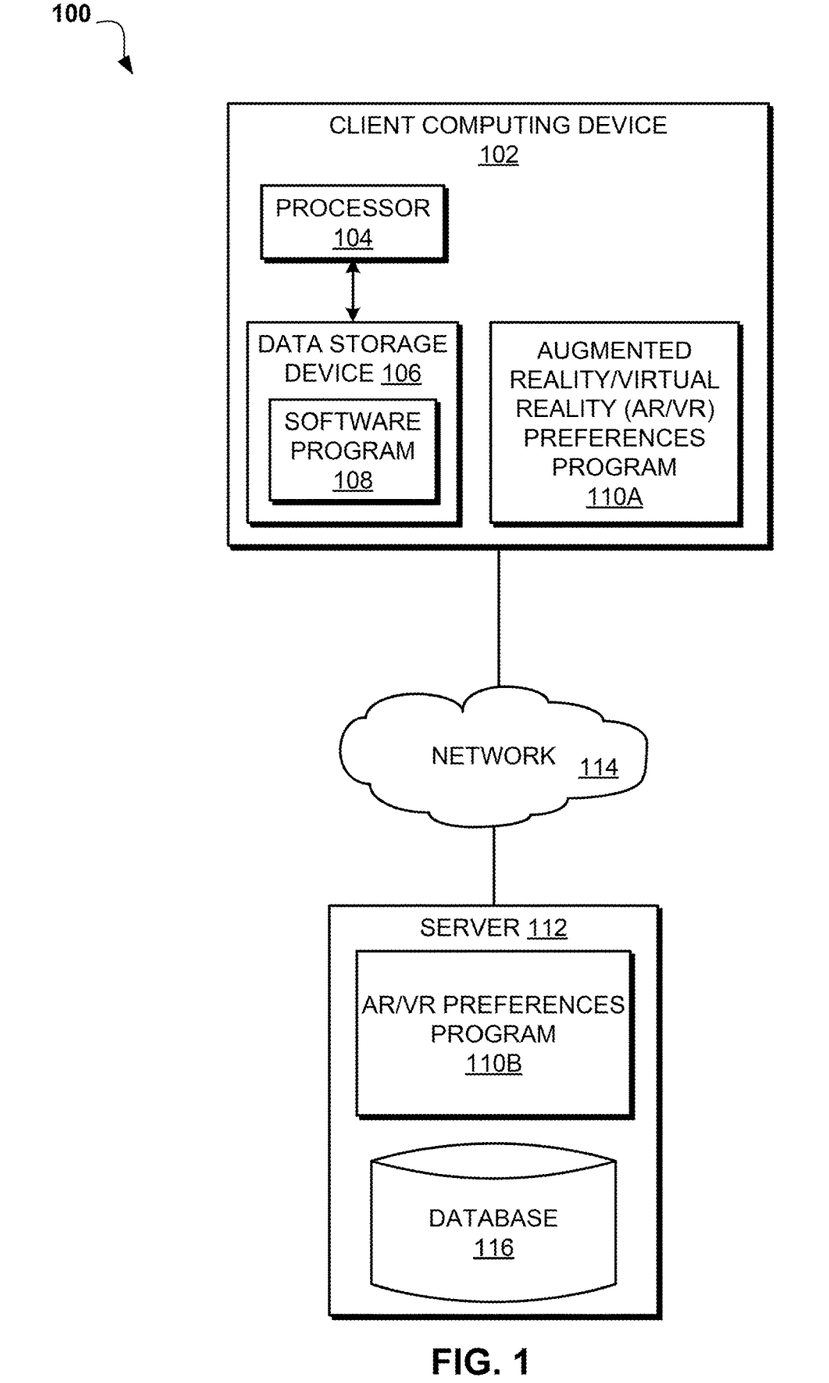
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and server 112 may each individually host an AR/VR preferences program 110A, 110B. In one or more other embodiments, the AR/VR preferences program 110A, 110B may be partially hosted on both the client computing device 102 and the server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and the AR/VR preferences program 110A and communicate with the server 112 via the communication network 114, in accordance with one embodiment of the invention. In one or more other embodiments, client computing device 102 may be, for example, an augmented reality device, a virtual reality device, a mobile device, a smartphone, a personal digital assistant, a netbook, a laptop computer, a tablet computer, a desktop computer, or any type of computing device capable of running a program and accessing a network. In at least one embodiment, when the client computing device 102 is an augmented reality device or a virtual reality device, the client computing device 102 may have a head mounted display allowing a user to observe a graphical user interface (GUI) or a surrounding environment through an augmentative lens. As previously described, one client computing device 102 is depicted in FIG. 1 for illustrative purposes, however, any number of client computing devices 102 may be utilized. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running the AR/VR preferences program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the AR/VR preferences program 110A, 110B may be capable of processing all received multimodal signals, analyzing each signal to interpret the priority of various user preferences in a preference/choice model, and generating an AR/VR space depicting a preferred set of user preferences as a recommendation or suggestion to the user. In at least one embodiment, the AR/VR preferences program 110A, 110B may be utilized in a real-world environment, such as an augmented or virtual tour of a real world environment, or a virtual environment, such as a video game. The AR/VR preferences method is explained in further detail below with respect to FIG. 2.

Figure 2:
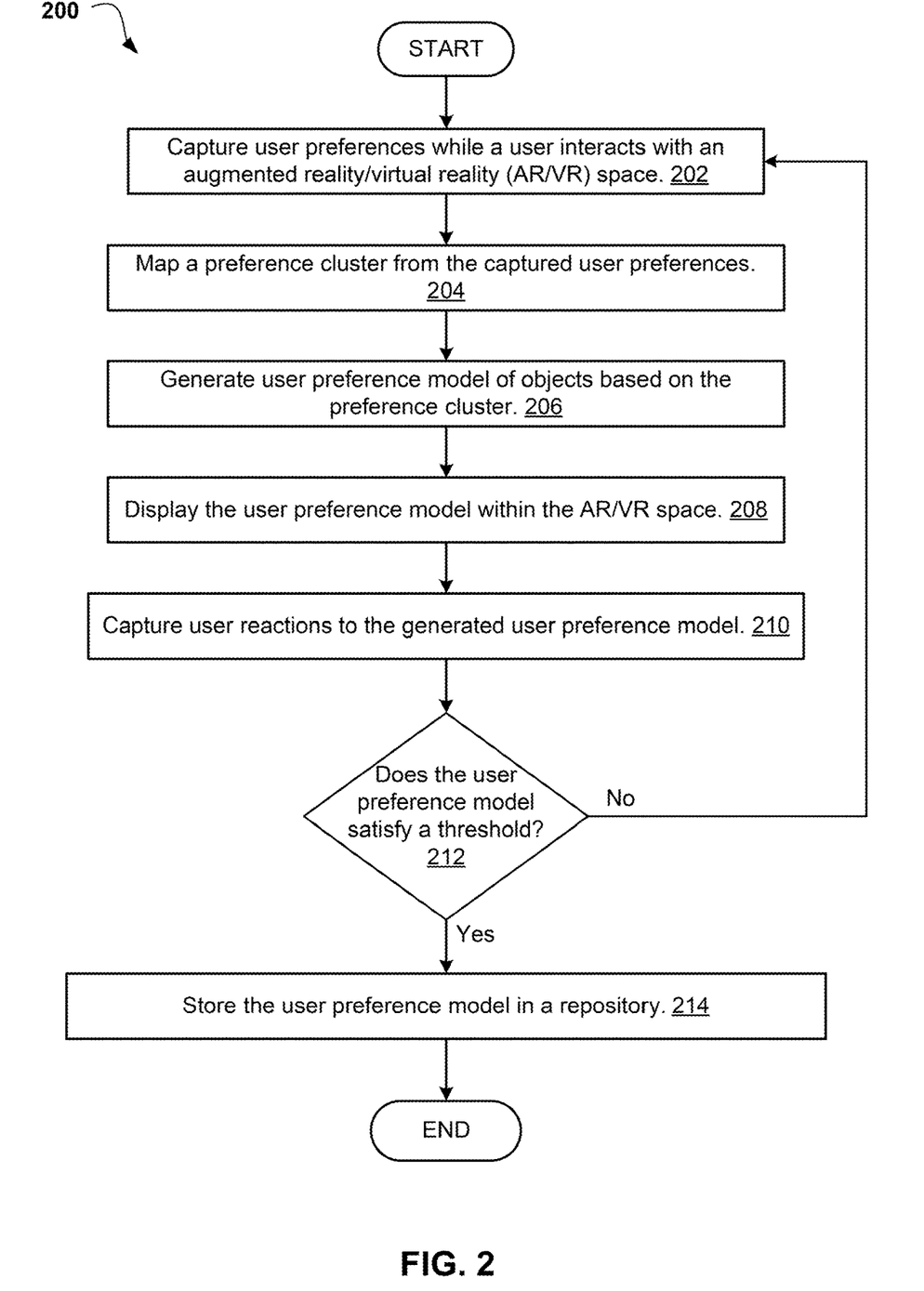
FIG. 2 illustrates an operational flowchart for an AR/VR preference process according to at least one embodiment.

Referring now to FIG. 2, an operational flowchart illustrating an AR/VR preference process 200 is depicted according to at least one embodiment. At 202, the AR/VR preferences program 110A, 110B captures user preferences while a user interacts with an AR/VR space. A number of situations exist under which a user may utilize an AR/VR system, such as client computing device 102, to interact with an environment. For example, a user may tour a model home in anticipation of making a purchase of the model home or a home with a similar layout as the model home. During the interaction, the user may wear an AR/VR system in order to view various objects placed within the environment as depicted in the AR/VR space. Continuing the previous example, typically, a model home may be staged with various furnishings to allow a potential buyer to envision what a fully lived-in home may look like. Typically, staged homes may be perceived more favorably, and thus have higher selling potential, than touring a house that is not staged, which may be more difficult for a potential purchaser to envision as their own. Utilization of an AR/VR system may allow the user to observe various furnishings throughout a potential home regardless of whether the potential home is staged in reality or staged in a manner in which a potential purchaser would furnish the space. For example, a user may tour an empty environment, but with the aid of an AR/VR system, the user may observe a fully furnished or occupied environment. While the user interacts with the environment using the AR/VR system, the AR/VR preferences program 110A, 110B may capture various items of user feedback, such as user movements, user gestures (e.g., pointing, head nod, shrug, clearing throat, etc.), amount of time spent in different areas of a given space, voice signals (e.g., vocal tone or vocal inflection), facial expressions, user body language, spoken words or phrases, biometric readings (e.g., heartrate readings), gaze time, gaze and focus location, etc.

In another embodiment, the AR/VR preferences program 110A, 110B may extract descriptive data from the captured the items of user feedback to identify the user preferences. The AR/VR preferences program 110A, 110B may utilize natural language processing, speech-to-text, and/or image recognition technologies to analyze the items of user feedback and extract descriptive data for items of interest to the user. For example, while touring a kitchen during an open house, a user may exclaim "I love this granite countertop" while reaching out and touching the countertop in the AR/VR space. In such a situation, the AR/VR preferences program 110A, 110B may capture an image of the user's current gaze position in order to identify the subject of the user's attention, the phrase "I love this granite countertop", the intensity of the user's emotion while speaking the phrase, the user's movement to reach out and touch the countertop, the user's facial expression while making the statement, and any corresponding changes to biorhythms made while the user makes the statement.

In at least one other embodiment, the AR/VR preferences program 110A, 110B may build a baseline model of user preferences based on an existing user database. The user preferences in an existing user database may be available from any number of sources, such as, but not limited to, a previous AR/VR experience, a social media database, or manual entry of user preferences prior to an initial interaction with the AR/VR preferences program 110A, 110B. For example, a user may have expressed opinions on specific colors in historical online social media posts. Upon a user opting-in to sharing data from one or more social media websites, the AR/VR preferences program 110A, 110B may gather the historical social media data to generate a baseline model of user preferences and display an AR/VR environment consistent with the baseline model. For example, if the AR/VR preferences program 110A, 110B determines that the user has a strong preference for natural colors in a central living space but blue in a bedroom space, the AR/VR preferences program 110A, 110B may generate an AR/VR environment consistent with these determined preferences and display the generated AR/VR environment to the user through the AR/VR system while the user tours a real-world environment, such as a model home.

In another embodiment, the AR/VR preferences program 110A, 110B may utilize biometric data captured by wearable devices, such as fitness trackers. For example, the AR/VR preferences program 110A, 110B may pair with a user-worn fitness tracker to capture various items of user data, such as heart rate, perspiration rate, breathing rate, global positioning system (GPS) location data, stress level, and $VO_2$ levels. In at least one embodiment, the AR/VR preferences program 110A, 110B may require a user to opt-in to the pairing between a wearable device as well as acknowledgement of the data to be shared with the AR/VR preferences program 110A, 110B prior to pairing and data transfer.

Then, at 204, the AR/VR preferences program 110A, 110B maps a preference cluster from the captured user preferences. Once the AR/VR preferences program 110A, 110B has captured user feedback of the environment, the AR/VR preferences program 110A, 110B may map each identified preference to a specific cluster to update a baseline cluster or, in the event no corresponding cluster exists, generate a new cluster for the identified preference and adding the generated cluster to the baseline model. For example, in the previous example where a user commented "I love this granite countertop", the AR/VR preferences program 110A, 110B may identify the cluster to which the preference belongs (i.e., kitchen) and any categories or sub-categories that may apply, such as "granite". The AR/VR preferences program 110A, 110B may utilize clustering techniques to cluster common areas and/or objects with the descriptive characteristics having the highest scores across different experiences and may add those clustered areas and/or objects to the user's preference model. For example, during multiple open house tours, a user may express favorability towards the kitchen. In one open house, a high score may apply to stainless steel appliances. In another open house, a high score may apply to abundant natural light. In yet another open house, a high score may apply to the use of white cabinetry. The AR/VR preferences program 110A, 110B may cluster each descriptive characteristic into a "kitchen context" cluster and, during any subsequent virtual home tours, the AR/VR preferences program 110A, 110B may utilize the "kitchen cluster" to apply stainless steel appliances, abundant natural light, and white cabinetry to the user's preference model. Clustering performed by the AR/VR preferences program 110A, 110B, as described above, is presented in further detail in FIG. 3 below.

In at least one embodiment, the AR/VR preferences program 110A, 110B may assign a numerical measure of user favorability, or user preference score, to each element (e.g., object, area, and characteristic) that the user provides feedback towards while engaging with an environment. The numerical value assigned to each item of feedback may be preconfigured during an initial set up of the AR/VR preferences program 110A, 110B by a user or by developers during program development. As the AR/VR preferences program 110A, 110B encounters specific items of user feedback, the AR/VR preferences program 110A, 110B may aggregate values to create the user feedback score for a particular element. For example, if during a home tour the user states "I really love this granite countertop", the AR/VR preferences program 110A, 110B may identify a value preassigned to the word "love" as "+5". The AR/VR preferences program 110A, 110B may identify the association of certain words to serve as addition/subtraction weights or multiplier weights to increase or decrease the score for the cluster based on the positive or negative association of the specific word. For example, in the previous situation, the word "really" in front of the word "love" may have a preconfigured multiplier weight of "x2" (i.e., multiply the base word's value by two) to result in a total score for the "granite countertop" cluster as "+10". In at least one embodiment, the user preference score may be either a positive or negative value to indicate the user's like or dislike, respectively, for each element. For example, an object, area, or characteristic with a positive user preference score may indicate the user's positive preference, or favorability, for that object, area, or characteristic. However, an object, area, or characteristic with a negative user preference score may indicate the user's negative preference, or dislike, for that object, area, or characteristic. In at least one embodiment, the larger the value of the user preference score, either in the positive or negative, may indicate the magnitude of the user's like or dislike for a particular area, object, or characteristic.

In at least one embodiment, the AR/VR preferences program 110A, 110B may rank each cluster based on importance or favorability to the user. For example, the AR/VR preferences program 110A, 110B may determine that user favors aspects of the kitchen, such as granite countertops and hardwood cabinets, to certain aspects of a backyard, such as a large patio space. The AR/VR preferences program 110A, 110B may identify specific user preference ranks based on the user's reaction to various objects and/or areas of interest associated with a positive or negative reaction. For example, if a user walks by an object and/or area and indicates a dislike for the object and/or area through spoken words and/or facial expressions, the AR/VR preferences program 110A, 110B may indicate a user's negative preference for the object and/or area.

Similarly, the AR/VR preferences program 110A, 110B may utilize the intensity of the user's reaction, whether positive or negative, to rank a specific object, area, and/or characteristic. For example, if a user exhibits a passing glance, acknowledgment, a small gesture, or a couple minor positive words but no follow through (e.g., "this chair is pretty nice") and then quickly moves on, the AR/VR preferences program 110A, 110B may assign a low interest intensity to the object, area, and/or characteristic at the focus of the user's attention. In another example, if the user lingers on an object, area, and/or characteristic, exhibits more interactions and attention, and more dialog toward the object, area, and/or characteristic (e.g., "I like this black granite countertop) while the user runs their hand along the countertop and looks at it from different angles, the AR/VR preferences program 110A, 110B may assign a medium interest intensity to the object, area, and/or characteristic at the focus of the user's attention. In yet another example, if the user shows a strong engagement, lots of interaction and focus on an object, area, and/or characteristic, strong emotional responses, and dialog praising the object, area, and/or characteristic (e.g., "This door is exactly like I envision in my dream home! I love the texture, the color, and the materials! It's perfect!") while the user is touching an object and/or area and retaining a long gaze duration at the object, area, and/or characteristic area with a strong level of excitement and emotion, the AR/VR preferences program 110A, 110B may assign a strong interest intensity to the object, area, and/or characteristic at the focus of the user's attention.

Next, at 206, the AR/VR preferences program 110A, 110B generates a user preference model of objects based on the preference cluster. Once the AR/VR preferences program 110A, 110B maps the user preferences to a corresponding cluster, the AR/VR preferences program 110A, 110B may generate or update a user preference model. The user preference model may include all mapped clusters of objects, areas, and characteristics based on the preferences captured by the AR/VR preferences program 110A, 110B. When the AR/VR preferences program 110A, 110B generates the user preference model, the AR/VR preferences program 110A, 110B may process the data stored in a corresponding repository, such as database 116, and generate a visual representation of the user preference model in an AR/VR space. To accurately generate the user preference model into a corresponding AR/VR space, the AR/VR preferences program 110A, 110B may require an input as to the environment, either real-world or virtual, to which the AR/VR preferences program 110A, 110B will apply the user preference model. For example, if the AR/VR preferences program 110A, 110B is to generate the user preference model to a home subject to an open house, the AR/VR preferences program 110A, 110B may ingest photographs uploaded to a local or third-party database, such as database 116, accessible to the AR/VR preferences program 110A, 110B. The AR/VR preferences program 110A, 110B may be capable of processing the ingested photographs using image processing techniques to recreate the subject home in a three-dimensional virtual space or calculate coordinates with which to calculate locations for each user preference object in the user preference model in an augmented reality space.

Then, at 208, the AR/VR preferences program 110A, 110B displays the user preference model within the AR/VR space. The AR/VR preferences program 110A, 110B may display the user preference model through any device, such as client computing device 102, capable of allowing the user to engage with the user preference model in an AR/VR space. For example, in the previous situation described in step 206, the AR/VR preferences program 110A, 110B may display the generated user preference model of the open house through a display screen of a tablet or smartphone so the user can observe how the viewable area would appear with objects fitting the user's preferences.

Next, at 210, the AR/VR preferences program 110A, 110B captures user reactions to the generated user preference model. Upon displaying the user feedback model in an AR/VR space, the AR/VR preferences program 110A, 110B may capture user reactions to the displayed user preference model similar to step 202. The AR/VR preferences program 110A, 110B may capture various items of user feedback, such as user movements, user gestures (e.g., pointing, head nod, shrug, clearing throat, etc.), amount of time spent in different areas of a given space, voice signals (e.g., vocal tone or vocal inflection) facial expressions, user body language, spoken words or phrases, biometric readings (e.g., heartrate readings), gaze time, gaze and focus location, etc., through various sensors attached to, embedded within, or otherwise communicatively coupled to client computing device 102.

Then, at 212, the AR/VR preferences program 110A, 110B determines whether each element in the user preference model satisfies a threshold. Upon capturing user reactions to the generated user preference model, the AR/VR preferences program 110A, 110B may utilize natural language processing, speech-to-text, and/or image recognition technologies to analyze the items of user feedback and extract descriptive data for items of interest to the user similar to step 204. The AR/VR preferences program 110A, 110B may analyze the user feedback to determine if each element (e.g., object, area, and characteristic) satisfies a threshold. For example, if the AR/VR preferences program 110A, 110B determines a user likes a specific piece of furniture in the baseline user preference model so as to display the piece of furniture in the user preference model within an AR/VR space but the user's feedback indicates that, although the user likes the piece of furniture, the lighting is not favorable to the piece of furniture in the area depicted within the AR/VR space, the AR/VR preferences program 110A, 110B may determine that the piece of furniture does not satisfy the threshold and that the user preference model should be updated. The threshold value may be preconfigured during an initial set up phase or manually adjusted by a user based on current user preferences. Whether each element satisfies the threshold may be based on a comparison of a numerical measure of user favorability assigned to an element by the AR/VR preferences program 110A, 110B to the threshold value. For example, in the earlier situation where the user stated "I really love this granite countertop" and the AR/VR preferences program 110A, 110B assigned a cluster score of +10 to the "granite countertop" cluster, the AR/VR preferences program 110A, 110B may determine that the cluster satisfies a preconfigured threshold value if the threshold value is preconfigured at +5.

In at least one embodiment, the AR/VR preferences program 110A, 110B may determine that the user feedback model satisfies the threshold when each object, area, and/or characteristic that has an associated feedback score by the user during an AR/VR session is above an individual object, area, or characteristic threshold value. If the AR/VR preferences program 110A, 110B determines the user preference model satisfies the threshold (step 212, "Yes" branch), then the AR/VR preference process 200 may proceed to step 214 to store the user preference model in a repository. If the AR/VR preferences program 110A, 110B determines the user preference model does not satisfy the threshold (step 212, "No" branch), then the AR/VR preference process 200 may return to step 202 to capture user preferences while the user interacts with the AR/VR space.

Next, at 214, the AR/VR preferences program 110A, 110B stores the user preference model in a repository. Once the AR/VR preferences program 110A, 110B determines the user preference model satisfies the threshold, the AR/VR preferences program 110A, 110B may determine the user preference model is satisfactory for retention and adequately trained during the current AR/VR session. Therefore, the AR/VR preferences program 110A, 110B may store the user preference model in a repository, such as database 116, for retention until use and/or further training during a subsequent AR/VR session.

Figure 3:
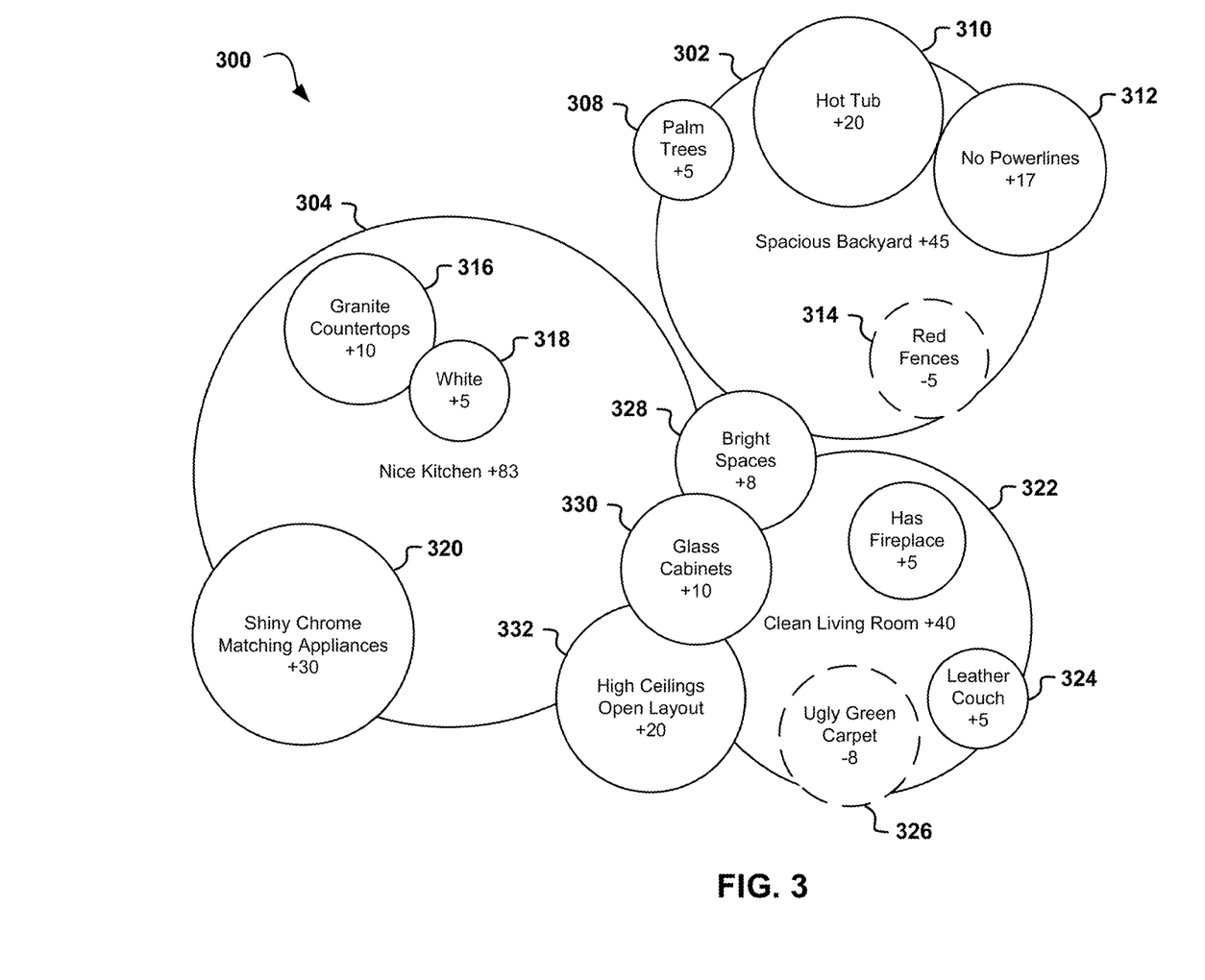
FIG. 3 is an exemplary block diagram of a preference cluster map utilized during the AR/VR preference process according to at least one embodiment.

Referring now to FIG. 3, an exemplary block diagram of a preference cluster map 300 utilized during the AR/VR preference process 200 is depicted according to at least one embodiment. The preference cluster map 300 may be a visual representation of the user preference model generated by the AR/VR preferences program 110A, 110B during the AR/VR preference process 200. In at least one embodiment, the preference cluster map 300 may be an interactive series of Venn diagrams generated on a graphical user interface (GUI) of a user device display screen, such as client computing device 102, to allow a user to visually review and modify the user preference model. The preference cluster map 300 may depict a number of labeled, or tagged, entities 302-332, such as circles, squares, rectangles, or any other object capable depiction in a Venn diagram.

In at least one embodiment, larger entities may be utilized to depict areas represented in the user preference model. For example, elements 302-306 depict a "spacious backyard", a "nice kitchen", and a "clean living space". Objects, areas, or characteristics of each larger entity element may be represented as medium or small entities. For example, element 302 representative of a "spacious backyard" may have four separate entities 308-314 of various sizes to represent aspects of the area, such as "palm trees", a "hot tub", "no powerlines", and "red fences".

In at least one other embodiment, some larger entity elements may have common objects, areas, or characteristics with each other. Such common objects, areas, or characteristics may be depicted as overlaid across two or more larger entity elements. For example, larger entity elements 304 and 306, representative of a "nice kitchen" and a "clean living room", respectively, may share entities 328-332 in common that show a user desires "bright spaces", "glass cabinets", and "high ceilings and open layout".

In yet another embodiment, each entity element 302-332 may be depicted with an associated name to the object, area, or characteristic and a user preference score, as calculated in step 204. For example, the preference cluster map 300 may depict an entity element 320 with the name "shing chrome matching appliances" with the user preference score of "+30". Additionally, the preference cluster map 300 may also change the border line patterns of each entity element depicted based on the positive or negative score depicted and/or the magnitude of the score value. For example, positive scores, such as entity elements 302-312, 316-324, and 328-332, may be represented with a solid line. However, negative scores, such as entity elements 314 and 326 may be represented by dashed lines. In another embodiment, the preference cluster map 300 may alter the size of each entity element 302-332 based on the value of the user preference score. For example, the "granite countertops" entity element 316, with a value of +10, may be depicted at twice the volume of the "leather couch" entity element 324, with a value of +5.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
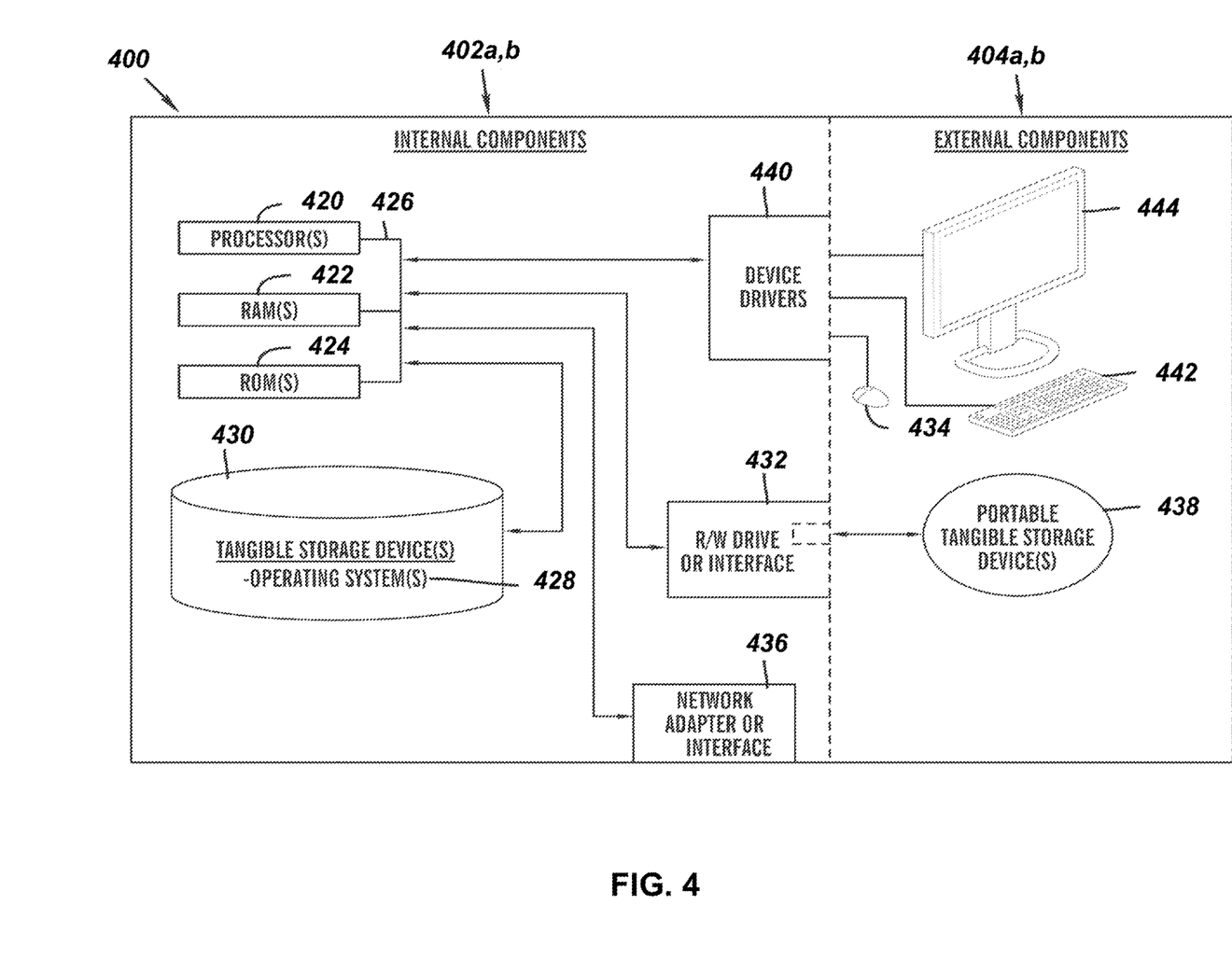
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the AR/VR preferences program 110A in the client computing device 102 and the AR/VR preferences program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the AR/VR preferences program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G, 4G, or 5G wireless interface cards or other wired or wireless communication links. The software program 108 and the AR/VR preferences program 110A in the client computing device 102 and the AR/VR preferences program 110B in the server 112 can be downloaded to the client computing device 102 and the server 112 from an external location via a network (for example, the Internet, a local area network or other, wide area network) and respective network adapters or interfaces 436. From the network adapters or interfaces 436, the software program 108 and the AR/VR preferences program 110A in the client computing device 102 and the AR/VR preferences program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
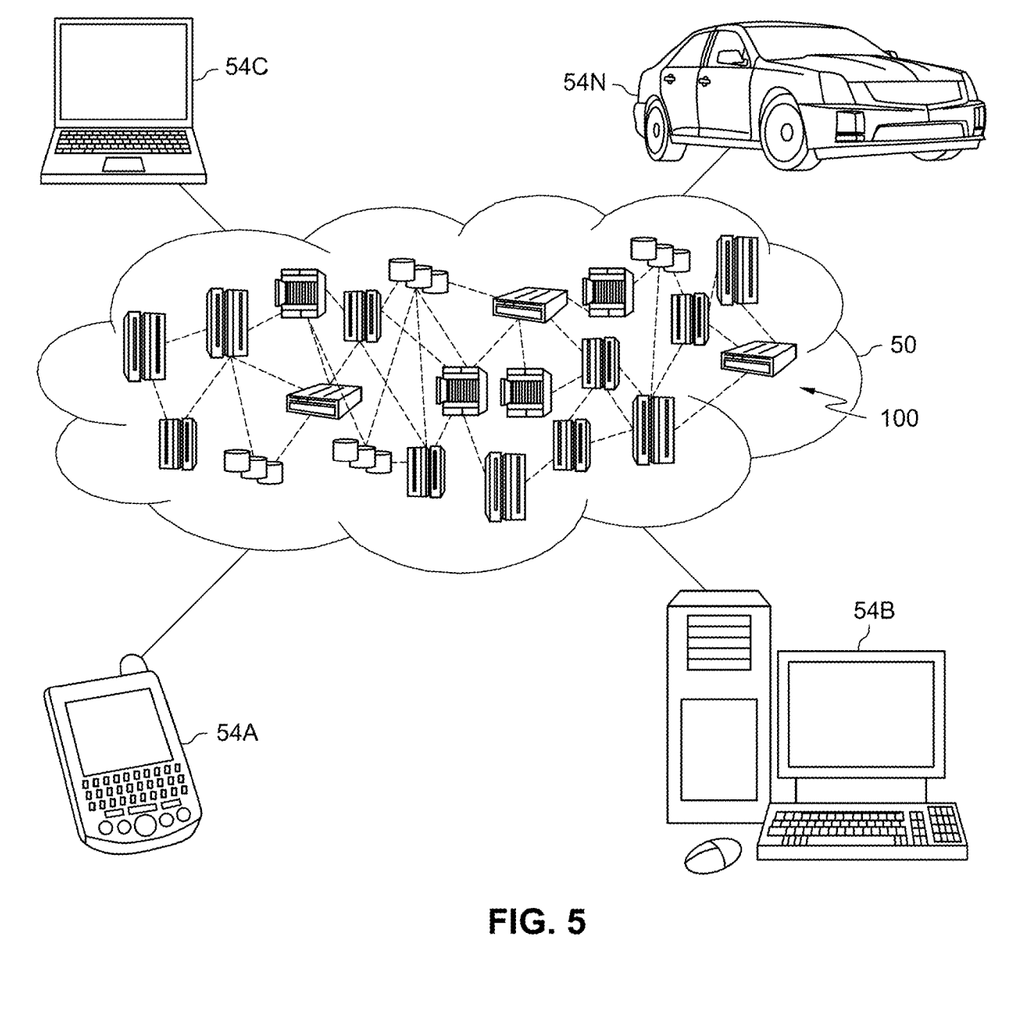
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
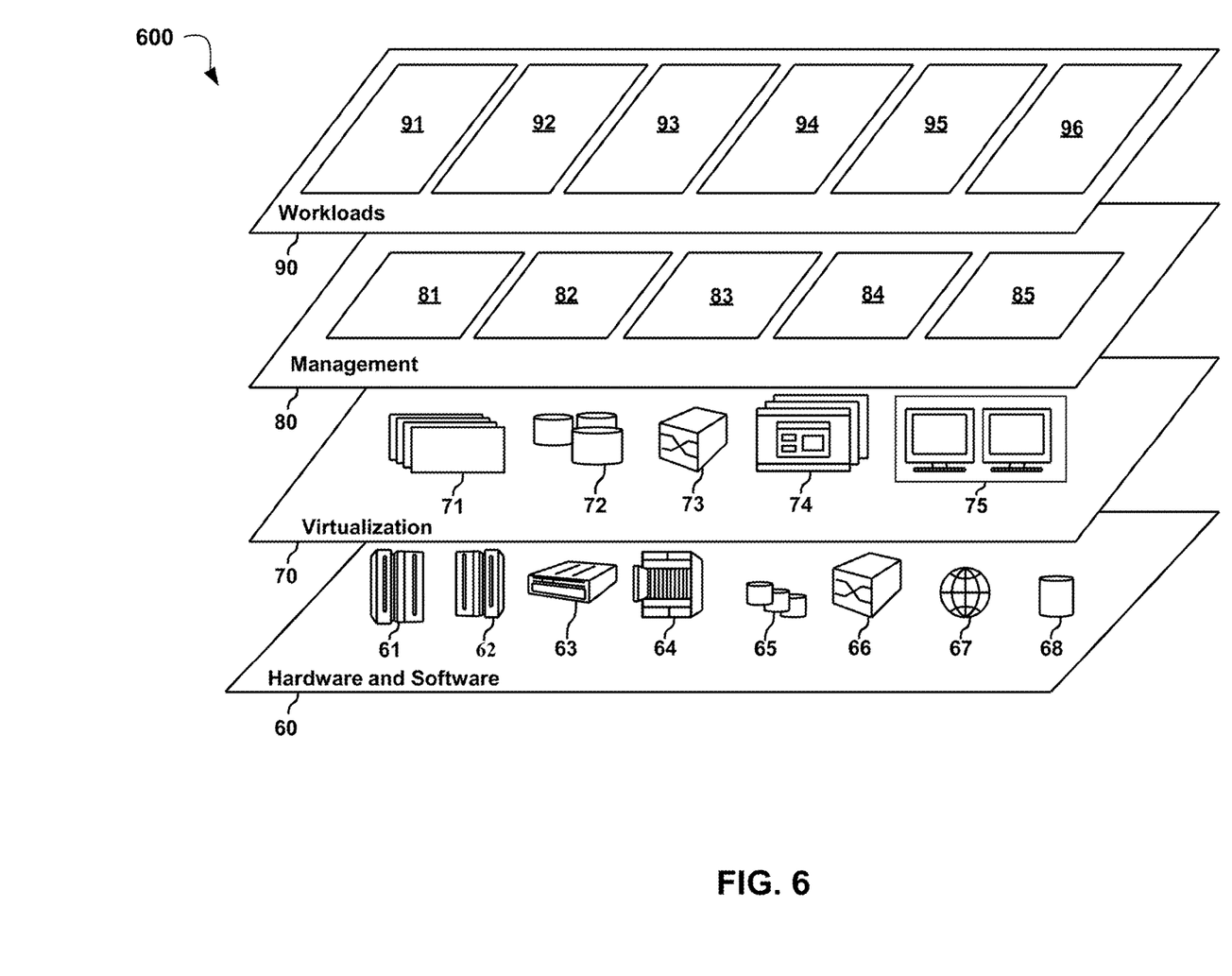
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AR/VR preference mapping 96. AR/VR preference mapping 96 may relate to capturing user preferences while interacting with an AR/VR space and generating a user preference model for one or more objects, areas, or characteristics for depiction in the AR/VR space.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    capturing, by a processor, a plurality of user preferences from a plurality of user feedback while a user interacts with elements of an augmented reality/virtual reality (AR/VR) space, wherein the plurality of user feedback includes words and phrases spoken by the user interacting with the AR/VR space;
    calculating a numerical score of user favorability for an element based on the captured user preferences, wherein the numerical score is modified by, either positively or negatively based on a word or a phrase, one or more weights that are added, subtracted, or multiplied to the numerical score when the word or the phrase is identified in the plurality of user feedback;
    mapping each element to one or more clusters based on the captured user preferences and the calculated numerical score;
    generating a user preference model of the elements based on the one or more mapped user preferences; and
    in response to the numerical score for an element satisfying a threshold value, modifying the element as displayed in the AR/VR space to correspond with the user preference model.

2. The method of claim 1, further comprising:
    capturing a plurality of additional user feedback to each element of the displayed user preference model; and
    determining whether each element in the displayed user preference model satisfies a threshold based on the plurality of captured additional user feedback corresponding to an element.

3. The method of claim 1, wherein mapping the one or more user preferences further comprises:
    in response to a cluster corresponding to the one or more user preferences existing in a baseline model, updating the baseline model; and
    in response to the cluster corresponding to the one or more user preferences not existing in the baseline model, generating and adding the cluster to the baseline model.

4. The method of claim 1, further comprising:
    generating, prior to the user engaging with the AR/VR space, a baseline user preference model based on a source selected from a group consisting of a previous AR/VR experience of the user, a social media database, and manual entry by the user of one or more user preferences.

5. The method of claim 1, further comprising:
    displaying a preference cluster map on a graphical user interface of a user device display screen, wherein the preference cluster map is visual representation of the generated user preference model as an interactive series of Venn diagrams, and wherein a name and a numerical measure of user favorability of each element is represented in the preference cluster map, and wherein each element is sized based on a value of the numerical measure of user favorability.

6. The method of claim 1, wherein the plurality of user feedback is selected from a group consisting of user movements, user gestures, an amount of time spent in different areas of a given space, voice signals, facial expressions, user body language, and spoken words or phrases.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
capturing, by a processor, a plurality of user preferences from a plurality of user feedback while a user interacts with elements of an augmented reality/virtual reality (AR/VR) space, wherein the plurality of user feedback includes words and phrases spoken by the user interacting with the AR/VR space;
calculating a numerical score of user favorability for an element based on the captured user preferences, wherein the numerical score is modified by, either positively or negatively based on a word or a phrase, one or more weights that are added, subtracted, or multiplied to the numerical score when the word or the phrase is identified in the plurality of user feedback;
mapping each element to one or more clusters based on the captured user preferences and the calculated numerical score;
generating a user preference model of the elements based on the one or more mapped user preferences; and
in response to the numerical score for an element satisfying a threshold value, modifying the element as displayed in the AR/VR space to correspond with the user preference model.

8. The computer system of claim 7, further comprising:
capturing a plurality of additional user feedback to each element of the displayed user preference model; and
determining whether each element in the displayed user preference model satisfies a threshold based on the plurality of captured additional user feedback corresponding to an element.

9. The computer system of claim 7, wherein mapping the one or more user preferences further comprises:
in response to a cluster corresponding to the one or more user preferences existing in a baseline model, updating the baseline model; and
in response to the cluster corresponding to the one or more user preferences not existing in the baseline model, generating and adding the cluster to the baseline model.

10. The computer system of claim 7, further comprising:
generating, prior to the user engaging with the AR/VR space, a baseline user preference model based on a source selected from a group consisting of a previous AR/VR experience of the user, a social media database, and manual entry by the user of one or more user preferences.

11. The computer system of claim 7, further comprising:
displaying a preference cluster map on a graphical user interface of a user device display screen, wherein the preference cluster map is visual representation of the generated user preference model as an interactive series of Venn diagrams, and wherein a name and a numerical measure of user favorability of each element is represented in the preference cluster map, and wherein each element is sized based on a value of the numerical measure of user favorability.

12. The computer system of claim 7, wherein the plurality of user feedback is selected from a group consisting of user movements, user gestures, an amount of time spent in different areas of a given space, voice signals, facial expressions, user body language, and spoken words or phrases.

13. A computer program product, the computer program product comprising:
one or more non-transitory computer-readable tangible storage media and program instructions stored on at least one of the one or more non-transitory tangible storage media, the program instructions executable by a processor capable of performing a method, the method comprising:
capturing, by a processor, a plurality of user preferences from a plurality of user feedback while a user interacts with elements of an augmented reality/virtual reality (AR/VR) space, wherein the plurality of user feedback includes words and phrases spoken by the user interacting with the AR/VR space;
calculating a numerical score of user favorability for an element based on the captured user preferences, wherein the numerical score is modified by, either positively or negatively based on a word or a phrase, one or more weights that are added, subtracted, or multiplied to the numerical score when the word or the phrase is identified in the plurality of user feedback;
mapping each element to one or more clusters based on the captured user preferences and the calculated numerical score;
generating a user preference model of the elements based on the one or more mapped user preferences; and
in response to the numerical score for an element satisfying a threshold value, modifying the element as displayed in the AR/VR space to correspond with the user preference model.

14. The computer program product of claim 13, further comprising:
capturing a plurality of additional user feedback to each element of the displayed user preference model; and
determining whether each element in the displayed user preference model satisfies a threshold based on the plurality of captured additional user feedback corresponding to an element.

15. The computer program product of claim 13, wherein mapping the one or more user preferences further comprises:
in response to a cluster corresponding to the one or more user preferences existing in a baseline model, updating the baseline model; and
in response to the cluster corresponding to the one or more user preferences not existing in the baseline model, generating and adding the cluster to the baseline model.

16. The computer program product of claim 13, further comprising:
generating, prior to the user engaging with the AR/VR space, a baseline user preference model based on a source selected from a group consisting of a previous AR/VR experience of the user, a social media database, and manual entry by the user of one or more user preferences.

17. The computer program product of claim 13, further comprising:
displaying a preference cluster map on a graphical user interface of a user device display screen, wherein the preference cluster map is visual representation of the generated user preference model as an interactive series of Venn diagrams, and wherein a name and a numerical measure of user favorability of each element is represented in the preference cluster map, and wherein each element is sized based on a value of the numerical measure of user favorability.

\* \* \* \* \*